United States Patent
Nakajima et al.

(10) Patent No.: US 11,702,000 B2
(45) Date of Patent: Jul. 18, 2023

(54) DISPLAY DEVICE AND MESSAGE TRANSMISSION METHOD

(71) Applicant: Sekisui Chemical Co., Ltd., Osaka (JP)

(72) Inventors: Daisuke Nakajima, Takatsuki (JP); Yuusuke Oota, Moriyama (JP); Atsushi Nohara, Kusatsu (JP); Masashi Yanai, Okayama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 288 days.

(21) Appl. No.: 16/753,557

(22) PCT Filed: Oct. 9, 2018

(86) PCT No.: PCT/JP2018/037623
§ 371 (c)(1),
(2) Date: Apr. 3, 2020

(87) PCT Pub. No.: WO2019/073981
PCT Pub. Date: Apr. 18, 2019

(65) Prior Publication Data
US 2020/0294431 A1 Sep. 17, 2020

(30) Foreign Application Priority Data
Oct. 10, 2017 (JP) .................................. 2017-197210

(51) Int. Cl.
*B60Q 1/26* (2006.01)
*B60J 1/02* (2006.01)
(Continued)

(52) U.S. Cl.
CPC ................ *B60Q 1/268* (2013.01); *B60J 1/02* (2013.01); *B60K 35/00* (2013.01); *B60Q 1/0017* (2013.01);
(Continued)

(58) Field of Classification Search
CPC .... B60J 1/02; B60J 1/08; B60K 35/00; B60K 2370/77; B60K 2370/785; B60Q 1/0017;
(Continued)

(56) References Cited

U.S. PATENT DOCUMENTS 8,606,430 B2 * 12/2013 Seder ..................... B60Q 1/268
701/2
9,994,144 B2 * 6/2018 Dellock ............ B32B 17/10036
(Continued)

FOREIGN PATENT DOCUMENTS

| CN | 101866097 | 10/2010 |
| CN | 105848956 | 8/2016 |

(Continued)

OTHER PUBLICATIONS

International Search Report dated Jan. 8, 2019 in International (PCT) Application No. PCT/JP2018/037623.
(Continued)

*Primary Examiner* — Jason M Han
(74) *Attorney, Agent, or Firm* — Wenderoth, Lind & Ponack, L.L.P.

(57) ABSTRACT

A display device includes a light source irradiating excitation light and a window glass for a vehicle, such as a windshield, capable of emitting visible light through incident radiation of the excitation light, and allows the window glass for a vehicle to emit the light so as to display a message toward an outside of the vehicle by irradiation with the excitation light.

14 Claims, 4 Drawing Sheets

(51) Int. Cl.
  *B60K 35/00* (2006.01)
  *B60Q 1/00* (2006.01)
  *G09F 13/02* (2006.01)
  *G09F 13/20* (2006.01)
  *G09F 21/04* (2006.01)

(52) U.S. Cl.
  CPC ............... *B60Q 1/26* (2013.01); *G09F 13/02* (2013.01); *G09F 13/20* (2013.01); *G09F 21/04* (2013.01); *G09F 21/048* (2013.01); *B60K 2370/77* (2019.05)

(58) Field of Classification Search
  CPC ........ B60Q 1/0088; B60Q 1/26; B60Q 1/268; B60Q 1/50; B60Q 1/503; G09F 13/02; G09F 13/20; G09F 19/18; G09F 21/04; G09F 21/048
  See application file for complete search history.

(56) References Cited

U.S. PATENT DOCUMENTS

| 2015/0220991 A1 | 8/2015 | Butts et al. |
| 2017/0088035 A1 | 3/2017 | Williams et al. |
| 2017/0293639 A1 | 10/2017 | Lee |
| 2017/0334342 A1 | 11/2017 | Dellock et al. |
| 2018/0319325 A1 | 11/2018 | Tatara et al. |

FOREIGN PATENT DOCUMENTS

| CN | 207000111 | 2/2018 |
| DE | 20 2017 103 060 | 7/2017 |
| JP | 3-121942 | 5/1991 |
| JP | 6-18075 | 3/1994 |
| JP | 8-72611 | 3/1996 |
| JP | 2000-25488 | 1/2000 |
| JP | 2000-356950 | 12/2000 |
| JP | 2003-53908 | 2/2003 |
| JP | 2006-59723 | 3/2006 |
| JP | 2008-176022 | 7/2008 |
| JP | 3209387 | 3/2017 |
| JP | 2017-95344 | 6/2017 |
| WO | 2017/056995 | 4/2017 |
| WO | 2017/073634 | 5/2017 |

OTHER PUBLICATIONS

Extended European Search Report dated May 6, 2021 in European Application No. 18866930.3.

* cited by examiner

DISPLAY DEVICE AND MESSAGE TRANSMISSION METHOD

TECHNICAL FIELD

The present invention relates to a display device and a message transmission method each utilizing a window glass for a vehicle such as a car.

BACKGROUND ART

Conventionally, in various vehicles such as a car, various types of information have been transmitted to a passenger in the vehicle, such as a driver, by a wide variety of devices such as a head-up display (for example, see PTL1) and a car navigation system. Further, in recent years, in laminated glass used as a window glass for a vehicle, a technique of utilizing the window glass as a display in which by allowing to contain a light emitting material in an interlayer so that the laminated glass emits light by irradiation with excitation light has also been developed, as disclosed in, for example, PTL2.

Meanwhile, a means for transmitting information from various vehicles to the outside of the vehicles has been limited to such an information transmission means as a warning sound by a Klaxon or the like, lighting hazard lamps or brake lamps, and the like. However, in these types of information transmission means, an intention of a driver may not sufficiently be transmitted to the outside of the vehicle, which may cause trouble.

CITATION LIST

Patent Literature

PTL1: JP 2000-25488 A
PTL2: JP 2017-95344 A

SUMMARY OF INVENTION

Technical Problem

Accordingly, transmitting the intention of a driver to the outside of a vehicle sufficiently has been desired in various vehicles such as a car. Further, in recent years, there has been a tendency of preferring a car having high usability characteristics and having high luxury characteristics, and there has been also an increase in the desire for displaying a wide variety of messages toward the outside of a car.

The present invention has been devised in view of the circumstances described above, and an object of the present invention is to provide a display device and a message transmission method each capable of transmitting various messages toward the outside of a vehicle with a simple configuration.

Solution to Problem

As a result of diligent studies, the inventors have found that the aforementioned problems can be solved by allowing a window glass for a vehicle to emit visible light through incident radiation of excitation light to enable displaying a message toward the outside, thereby accomplishing the following present invention.

That is, the present invention provides [1] to [18] below.
[1] A display device comprising:
a light source irradiating excitation light; and
a window glass for a vehicle emitting visible light through incident radiation of the excitation light, wherein
the window glass for a vehicle is allowed to emit the light so as to display a message toward an outside of the vehicle by irradiation with the excitation light.
[2] The display device according to [1], wherein the message comprises at least one selected from the group consisting of a sentence, a trademark, a warning, and a message showing a vehicle condition.
[3] The display device according to [1] or [2], wherein the message is for surrounding cars or for pedestrians and light vehicles.
[4] The display device according to any one of [1] to [3], wherein the window glass for a vehicle comprises a transparent plate.
[5] The display device according to [4], wherein the window glass for a vehicle has a multilayer structure comprising a laminate of at least one transparent plate and a resin film, and
the resin film comprises a resin and a fluorescent material capable of emitting visible light through incident radiation of excitation light.
[6] The display device according to any one of [1] to [5], wherein a surface on a vehicle interior side of the window glass for a vehicle is irradiated with the excitation light.
[7] The display device according to any one of [1] to [6], capable of displaying the message toward the outside of the vehicle based on an inputted voice.
[8] The display device according to any one of [1] to [7], capable of displaying the message toward the outside of the vehicle when it is inferred that a movable body is approaching.
[9] The display device according to any one of [1] to [8], capable of changing a position of displaying the message toward the outside of the vehicle depending on a direction from which a movable body is approaching.
[10] A message transmission method using a light source capable of irradiating excitation light and a window glass for a vehicle capable of emitting visible light through incident radiation of the excitation light and allowing the window glass for a vehicle to emit the light so as to display a message toward an outside of the vehicle by irradiation with the excitation light, thereby transmitting the message toward the outside of the vehicle.
[11] The message transmission method according to [10], wherein the message comprises at least one selected from the group consisting of a sentence, a trademark, a warning, and a message showing a vehicle condition.
[12] The message transmission method according to [10] or [11], wherein the message is for surrounding cars or for pedestrians and light vehicles.
[13] The message transmission method according to any one of [10] to [12], wherein the window glass for a vehicle comprises a transparent plate.
[14] The message transmission method according to [13], wherein
the window glass for a vehicle has a multilayer structure comprising a laminate of at least one transparent plate and a resin film, and
the resin film comprises a resin and a fluorescent material capable of emitting visible light through incident radiation of excitation light.
[15] The message transmission method according to any one of [10] to [14], comprising irradiating a surface on a vehicle interior side of the window glass for a vehicle with the excitation light.

[16] The message transmission method according to any one of [10] to [15], comprising displaying the message toward the outside of the vehicle based on an inputted voice.

[17] The message transmission method according to any one of [10] to [16], comprising displaying the message toward the outside of the vehicle when it is inferred that a movable body is approaching.

[18] The message transmission method according to any one of [10] to [17], comprising changing a position of displaying the message toward the outside of the vehicle depending on a direction from which a movable body is approaching.

Advantageous Effects of Invention

The present invention provides a display device and a message transmission method each capable of transmitting various messages toward the outside of a vehicle by a simple configuration.

DESCRIPTION OF EMBODIMENTS

Hereinafter, the embodiments of a display device and a message transmission method of the present invention will be described with reference to the drawings.

Figure 1:
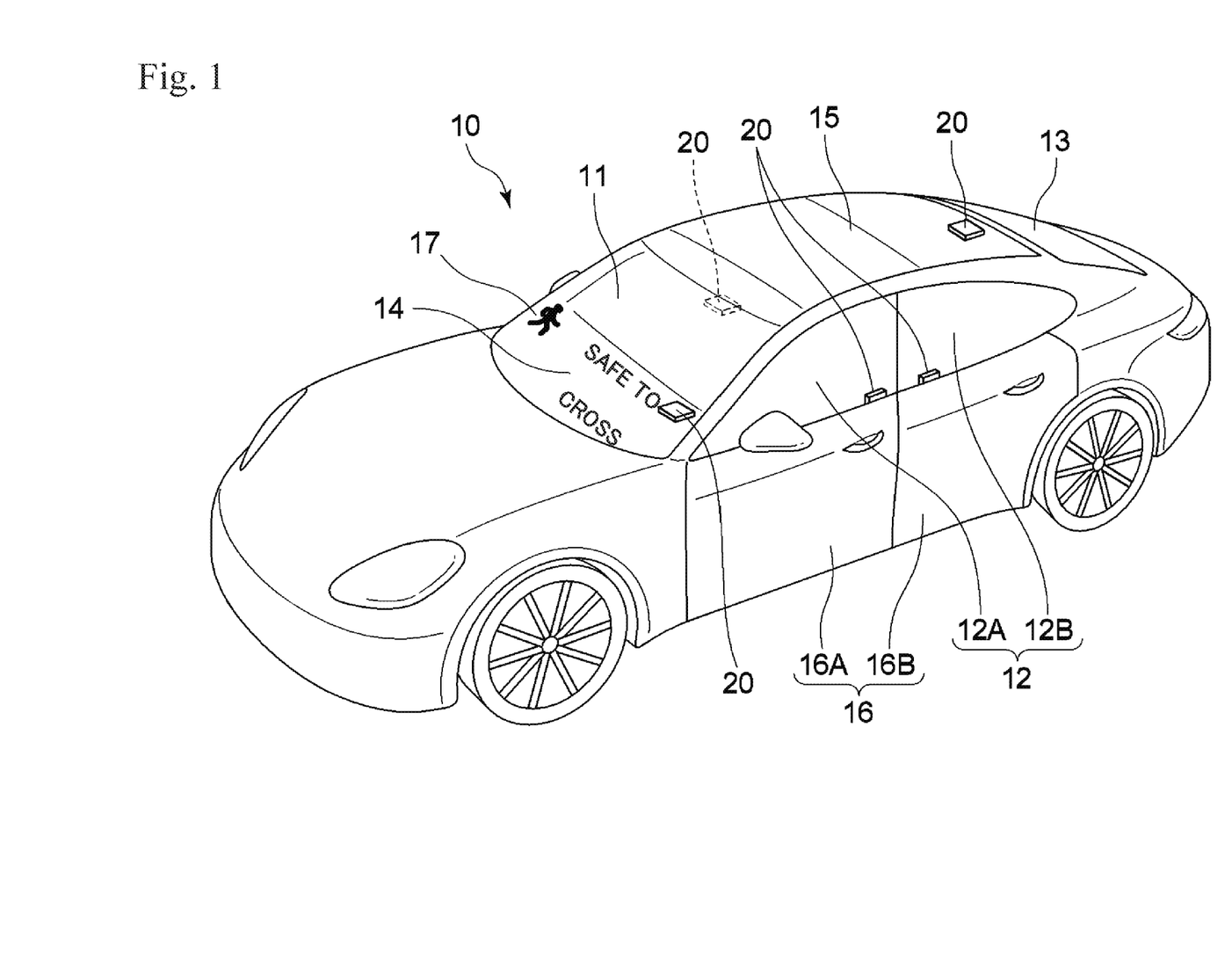
FIG. 1 shows a car to which a display device according to one embodiment of the present invention is applied.

FIG. 1 shows a car to which the display device according to one embodiment of the present invention is applied. As shown in FIG. 1, a car 10 has a windshield 11, a side glass 12, a rear glass 13, and the like as a window glass for a vehicle. The windshield 11 is a window glass provided at a front surface of a car, and the rear glass 13 is a window glass provided at a rear surface of a car. The side glass 12 is a window glass provided at a side surface of a car.

The side glass 12 generally refers to a front side glass 12A provided at a front side door 16A and a rear side glass 12B provided at a rear side door 16B, but includes, for example, a delta window glass (not illustrated in FIG. 1) provided further in front of the front side glass 12A.

In this embodiment, at least one of the window glasses for a vehicle, in which a fluorescent material or the like is contained, serves as a window glass capable of emitting visible light through irradiation with excitation light. Hereinafter, the window glass capable of emitting visible light through irradiation with excitation light is also collectively called "light emitting glass".

As shown in FIG. 1, light source units 20 each having a light source are provided inside the car 10. The light source is a light source of excitation light from which the excitation light is emitted. The light source together with the light emitting glass composes the display device of the present invention. The light source unit 20 may be provided at an appropriate place in the car interior so that the light emitting glass can be irradiated with the excitation light. For example, in the case when light is emitted from the windshield 11, the light source unit may be provided on a dashboard 14 or on the front side of a roof 15. Further, in the case when light is emitted from the rear glass, the light source unit may be provided, for example, on the back side of the roof 15.

Further, in the case when the side glass 12 is employed as the light emitting glass, the light source unit may be provided on the inner surface of the door body of the side door 16A that holds the side glass 12, or the likes. More specifically, in the case when the front side glass 12A is irradiated with the excitation light, the light source unit may be provided on the inner surface of the door body of the front side door 16A. Further, in the case when the rear side glass 12B is irradiated with the excitation light, the light source unit may be provided on the inner surface of the door body of the rear side door 16B.

In FIG. 1, a plurality of light source units 20 are shown as an example for the sake of description, but at least one light source unit 20 may be provided inside a car.

In this embodiment, the light emitting glass emits visible light through irradiation of the excitation light from the light source so as to display a message 17 toward the outside of the car with the emitted light. That is, this embodiment provides a method for transmitting a message toward the outside of the car by using any one of the window glasses for a vehicle as the light emitting glass to display the message 17 toward the outside of the car with the light emitting glass.

In cars, at least one of the windshield 11, the side glass 12, and the rear glass 13 is preferably used as the light emitting glass. Further, in the case when the side glass 12 is used as the light emitting glass, one or both of the front side glass 12A and the rear side glass 12B are preferably used as the light emitting glasses.

Figure 2:
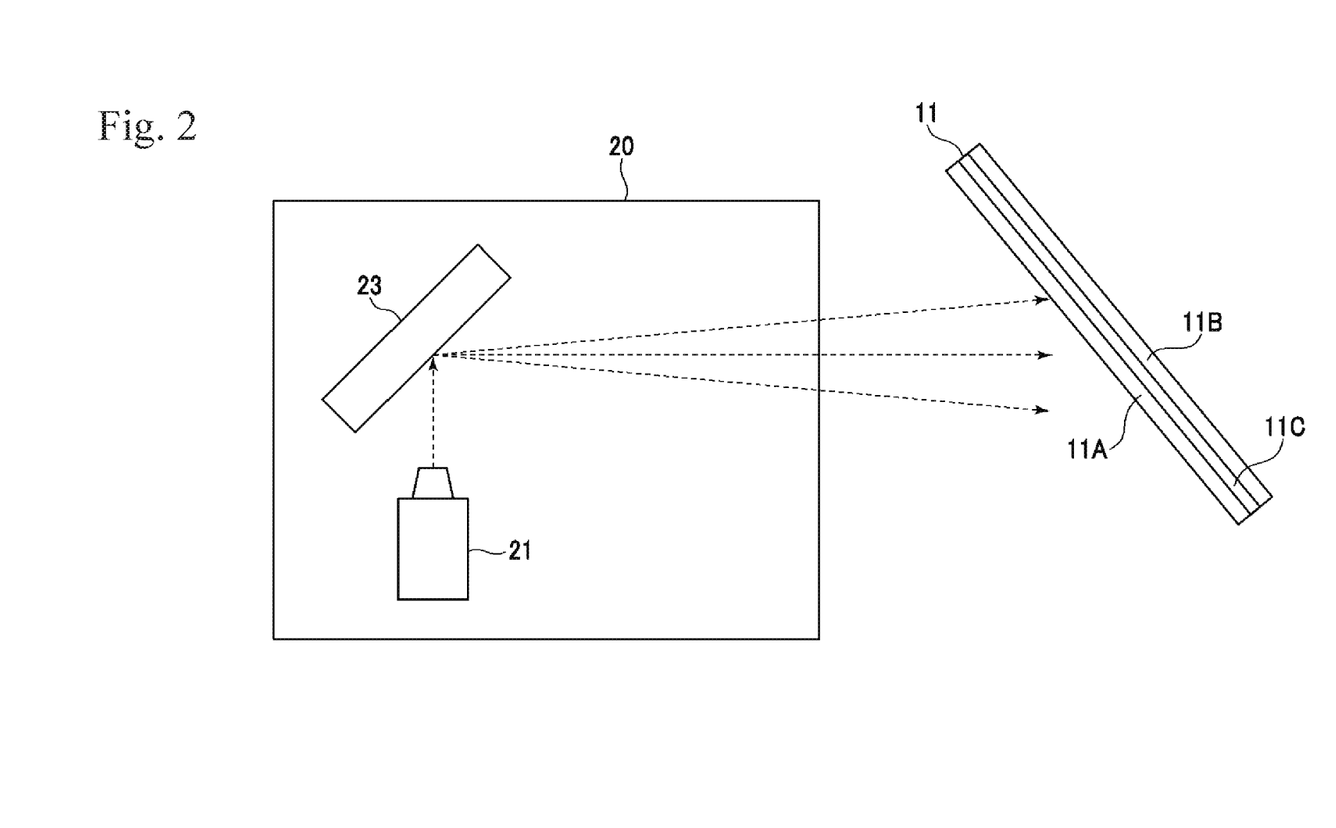
FIG. 2 is a schematic diagram showing a display device according to one embodiment of the present invention.

FIG. 2 is a schematic diagram showing a light source unit. In this embodiment, the light source unit 20 includes a light source 21 that emits excitation light and a MEMS (Micro Electro Mechanical Systems) mirror 23. As the light source 21, laser light sources, LED light sources, Xenon lamps, and the like are used.

The maximum emission wavelength of the light irradiated from the light sources 21 is not specifically limited, but is preferably 420 nm or less, more preferably 410 nm or less, further preferably 408 nm or less. Further, it is preferably 300 nm or more, more preferably 350 nm or more, further preferably 380 nm or more. By adjusting the maximum emission wavelength of the light irradiated from the light sources 21 to such a lower limit or more and such an upper limit or less, the light emitting glass can emit visible light more efficiently by irradiation with the excitation light from the light sources 21.

The light emitting glass is irradiated from the surface on the car interior side of the light emitting glass with the excitation light from the light source 21. The MEMS mirror 23 is, for example, swingable about two axes and irradiates the light emitting glass with the light from the light source 21 by scanning.

Here, the light emitting glass (in FIG. 2, the windshield 11) is irradiated in a desired pattern with the excitation light from the light source 21 as scanning light via the MEMS mirror 23 the drive of which is controlled. Portions irradiated with the excitation light in the light emitting glass emit light so as to display a desired message 17 on the light emitting glass by the light emission.

In this embodiment, since the MEMS mirror 23 is generally small in size, display of a message can be attained by use of the MEMS mirror without occupying a large space inside the car.

As shown in FIG. 2, the light emitting glass (in FIG. 2, the windshield 11) is, for example, laminated glass including two transparent plates 11A and 11B, and an interlayer 11C disposed therebetween, in which the transparent plates 11A and 11B are bonded by the interlayer 11C. In the light emitting glass, the interlayer 11C may be composed of a resin film containing a fluorescent material (light emitting layer) or may include two or more resin films at least one of which is a resin layer containing a fluorescent material (light emitting layer). However, the light emitting glass is not limited to such a configuration, and any configuration may be employed as long as at least one of its layers is a light emitting layer that emits light, as will be described in detail below.

Specific examples of the message displayed by light emission on the light emitting glass are shown in FIGS. 3 to 6. FIG. 3, FIGS. 4 and 5, and FIG. 6 each show a mode in which the message 17 is displayed on the windshield 11, the rear glass 13, and the side glass 12, respectively. However, the mode of the message is not limited to those shown in these figures.

As shown in FIGS. 3 to 6, the message 17 is constituted by at least one character, at least one design, or a combination of these. A mark, a figure, and the like are also included in the character and the design. The size of one of the characters projected on the light emitting glass and the size of one of the designs projected thereon are preferably 5 cm or more in both height and width.

Further, as will be described later, the message 17, when displayed on the windshield 11 or the rear glass 13, is a message for surrounding cars, pedestrians, and light vehicles in many cases. Therefore, the sizes are preferably made relatively large so that the message can easily be distinguished from an outside position apart from the car. Accordingly, among the aforementioned ranges, the sizes are more preferably 10 cm or more, still more preferably 20 cm or more in both height and width.

Meanwhile, the message, when displayed on the side glass 16, is a message for vehicle passengers such as a driver of the car in many cases, therefore the sizes do not have to be made so large, and the sizes of 5 cm or more are enough as described above, but from the viewpoint of further enhancing the visibility, the sizes are preferably 10 cm or more. That is, in the case when both of the windshield 11 and the side glass 12 are used as a light emitting glass, the characters or the designs displayed on the side glass 12 are preferably smaller than the characters or the designs displayed on the windshield 11 in both height and width.

The upper limit of the sizes of the characters and the designs are not specifically limited, but is, for example, 100 cm or less, preferably 50 cm or less in both height and width.

Further, the light emitting glass is irradiated with the excitation light so that the characters projected on the light emitting glass are mirror characters when viewed from the inside of the car in order for the characters, when viewed from the outside of the car, to be recognized correctly.

Figure 3:
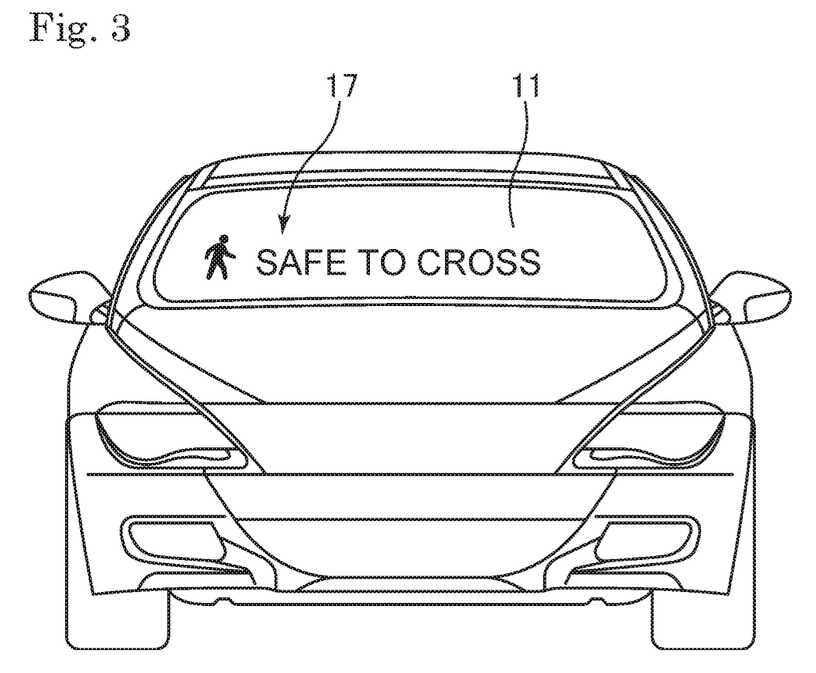
FIG. 3 is one example of a message displayed by a display device.
Figure 4:
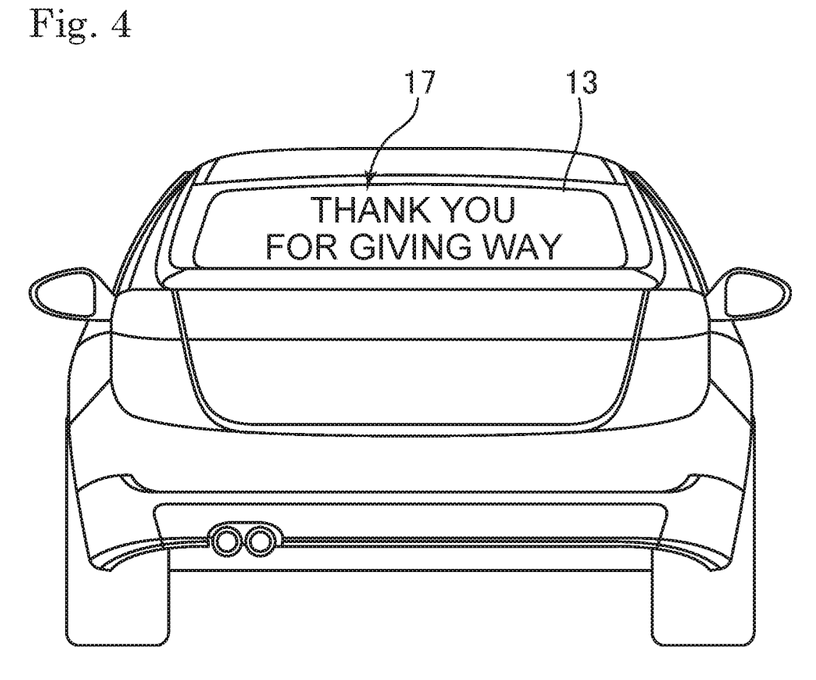
FIG. 4 is one example of a message displayed by a display device.
Figure 5:
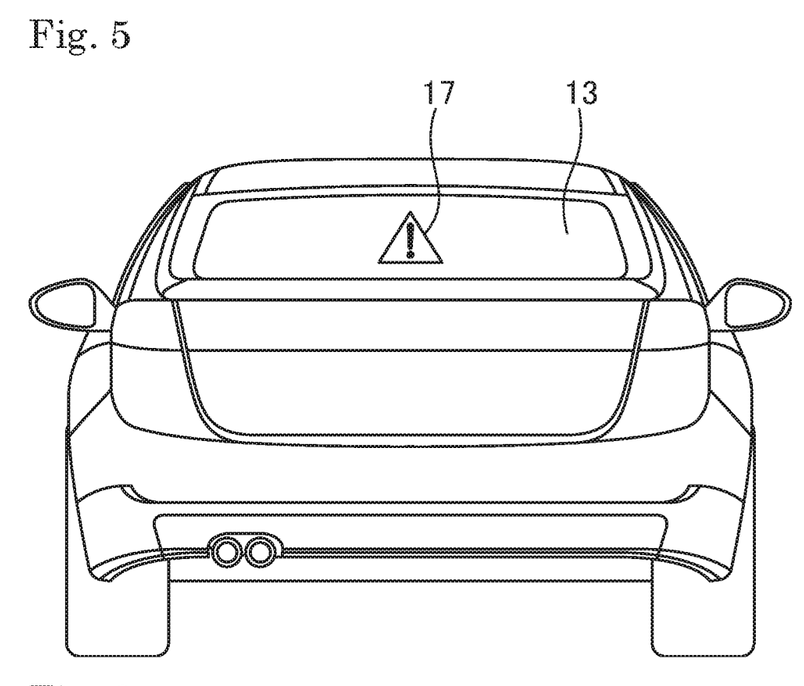
FIG. 5 is one example of a message displayed by a display device.
Figure 6:
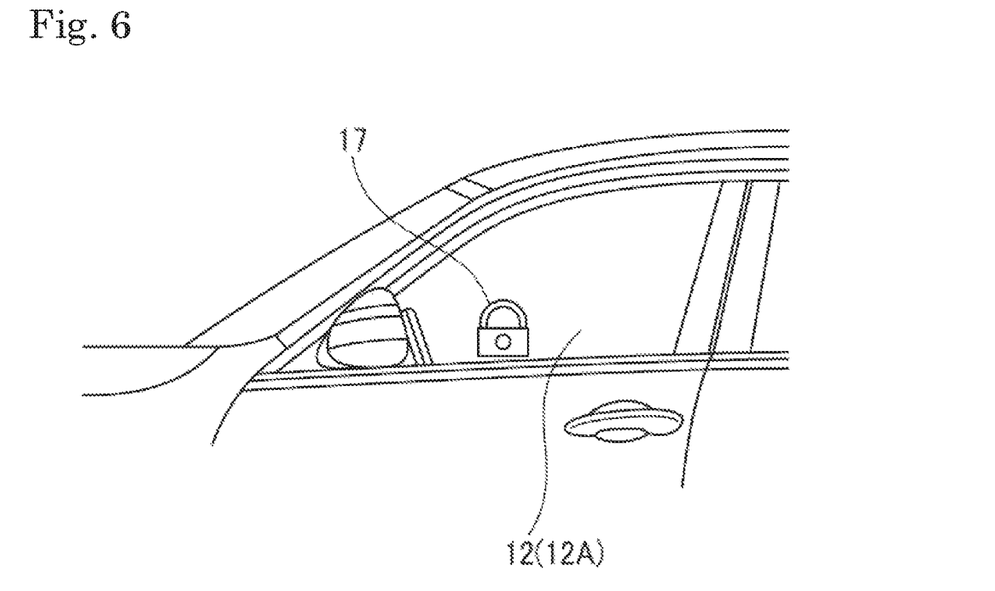
FIG. 6 is one example of a message displayed by a display device.

The message 17 projected on each light emitting glass is not specifically limited, and may be composed of only characters, as shown in FIG. 4, only a design, as shown in FIGS. 5 and 6, or a combination of characters and a design, as shown in FIG. 3. Examples of the message 17 include a sentence, a trademark, a warning, and a message showing a car condition. Examples of the message 17 include a message for surrounding cars, and a message for surrounding pedestrians and light vehicles. The light vehicle refers to a bicycle, a motorbike, and the like. Further, the message may be a message for vehicle passengers such as a driver of the car outside the car before getting into the car.

Next, the message 17 will be described more specifically. Examples of the sentence used as the message 17 include messages for surrounding light vehicles and pedestrians. Specific examples include messages such as "SAFE TO CROSS." Further, specific examples include sentences for surrounding cars, such as "THANK YOU FOR GIVING WAY." Further, the sentence may also be a sentence for vehicle passengers such as a driver before getting into a car, and examples of such a sentence include greeting phrases such as "HELLO" and "WELCOME!" The sentence may also be combined with a design, as shown in FIG. 3.

Further, examples of the sentence include catchwords that show the characteristics of a company or a product directly, and when these are displayed, the message 17 thereby has a function as advertisement.

Further, examples of the warning include warnings for any of surrounding cars, light vehicles, and pedestrians. Specifically, the warning may be a warning that shows warning by a design such as a warming mark shown in FIG. 5, or may be a sentence or a combination of a sentence and a design.

Examples of the trademark include a company name, an abbreviation of a company, a common name of a company, a trade name, and a product logo. When a trademark is contained in the message 17, the message 17 has a function as advertisement. Further, by displaying a logo or the like having high design quality makes it possible to enhance the luxury characteristics of a car.

Further, when the message 17 is a message that shows a car condition, examples of the message 17 include a lock state of a door, a driving state of an engine, and car interior temperature. For example, as shown in FIG. 6, when a design showing the lock state of a door is displayed by the message 17, a person outside the car can recognize whether the door is locked or not, that is, a car condition.

The message 17 may be displayed on a predetermined light emitting glass, for example, in such a way that one or a plurality of message candidates are stored in advance in a memory provided in the car, and at least one of the message candidates is called through an switch operation by a crew such as a driver.

Further, a microphone may be provided in the car to display the message on the light emitting glass based on a voice inputted from the microphone. Here, the inputted voice may be displayed directly on the light emitting glass, or at least one message may be selected from a plurality of message candidates based on the inputted voice and displayed on the light emitting glass. For example, when "Safe to cross" is inputted by a voice, the message shown in FIG. 3 may be displayed, when "Thank you" is inputted by a voice, the message shown in FIG. 4 may be displayed, and when "Warning" is inputted by a voice, the warning mark shown in FIG. 5 may be displayed.

Further, when two or more light emitting glasses are present, the light emitting glass to display the message 17 by light emission may be determined by a switch operation or may be determined in advance depending on the type of the message. Further, the light emitting glass to display the message may also be determined by a voice message. For example, the predetermined message 17 may be set so as to be displayed on the rear glass 13 when "Thank you. Rear." is inputted by a voice, as shown in FIG. 4.

When the message 17 is displayed through an input action, such as a switch operation or voice input, by a crew, the message 17 is usually a message send by the crew such as a driver toward drivers of surrounding vehicles and pedestrians. Accordingly, such a message is preferably displayed by light emission on the windshield 11 or the rear glass 13 because of easiness of visual recognition from surrounding vehicles and pedestrians. When the message is displayed on the windshield 11, the message 17 is preferably displayed by light emission in front on the front passenger's seat side so as not to obstruct the view of the driver.

Further, the configuration may be such that a detector is provided in a car, and when it is inferred that a movable body such as a human or a vehicle (hereinafter, also referred to as "the human or the like") is approaching by the detector, the message 17 is displayed on the light emitting glass by light emission. Examples of the detector include a human sensor, a stereo camera, an objective sensor provided in a car. The human sensor is a sensor configured to detect that a human is approaching the car. The objective sensor is a sensor configured to detect that a movable body such as a human or a vehicle is approaching the car. Further, the stereo camera detects that a human, an object, or the like is approaching the car by analyzing images capturing the outside of the car.

Also in the case of using the detector in this way, one or a plurality of message candidates are stored in advance in a memory provided in the car, and a message depending on the direction from which the human or the like is approaching, the distance from the approaching human or the like, car conditions, and the like is read out from the memory, and then, the message 17 read-out may be displayed on the light emitting glass.

The message 17 to be displayed on the light emitting glass in the case when it is inferred by the detector that the human or the like is approaching is preferably a message for a passenger of the car, such as a driver of the car. Displaying the message toward a passenger such as a driver of the car who is approaching the car can enhance the luxury characteristics and the usability characteristics of the car.

As the specific message 17 displayed by light emission in the case when it is inferred by the detector that the human or the like is approaching, a message showing a trademark, a sentence, a car condition, or the like is preferable. For example, when a trademark such as a logo having high design quality or a greeting phrase such as "HELLO" or "WELCOME" is displayed on the glass, a passenger can feel the luxury characteristics before getting into the car. Further, when a car condition is displayed, the usability characteristics can be enhanced.

A passenger such as a driver who is outside the car approaches the car during a stop. Accordingly, such a mode in which the message is displayed by light emission during a stop and when the human or the like is approaching is more preferable.

Further, since a passenger such as a driver gets into the car during a stop from the side door 16, the aforementioned message 17 showing a trademark, a sentence, a car condition, or the like is preferably displayed on the side glass 12 as shown in FIG. 6 so that the it is easy for the passenger to visually recognize the message. Further, the side glass 12 on which the message 17 is displayed is particularly preferably the front side glass 12A on the driver's seat side in order to allow the driver of the car to visually recognize these messages.

Further, the position of displaying the message 17 toward the outside of the car may be set so as to be changed depending on the direction from which the human or the like is approaching.

For example, in the case when two or more window glasses of a plurality of window glasses of a car are light emitting glasses, the light emitting glass to display the message 17 may be changed depending on the direction from which the human or the like is approaching. For example, when it is detected that the human or the like is approaching toward the side door 16 on the left side, the message is displayed on the side glass 12 on the left side, and when it is detected that the human or the like is approaching toward the side door 16 on the right side, the message is displayed on the side glass 12 on the right side. Further, when it is detected that the human or the like is approaching toward the front face or the rear face of the car from the front or the rear, respectively, the message 17 may be displayed on the windshield 11 or the rear glass 13, respectively. Such configurations make the message 17 more easily recognizable by the passenger of the car and the like.

Further, the display position may be set so as to be changed in one light emitting glass depending on the direction from which the human or the like is approaching. For example, in case where the windshield 11 is the light emitting glass, when a human is approaching from the front left, the message 17 may be displayed on the left side of the windshield 11, and when a human is approaching from the front right, the message 17 may be displayed on the right side of the windshield 11. Similarly, for example, in the case where the rear glass 13 is the light emitting glass, when a human is approaching from the back left, the message 17 may be displayed on the left side of the rear glass 13, and when a human is approaching from the back right, the message 17 may be displayed on the right side of the rear glass 11. Similarly, the display position may be changed in one glass also with respect to the side glass 12. Changing the display position also in the same glass in this way makes the message 17 more easily recognizable to the approaching human or the like.

Needless to say, when there are two or more light emitting glasses, the light emitting glass to display the message 17 and the display position in the light emitting glass may be set so as to be changed depending on the direction from which the human or the like is approaching.

Further, the message 17 may be displayed based on the opening and closing actions of doors of a car. For example, when a door of the car is closed, the message showing whether the door is locked or not may be displayed, as shown in FIG. 6. This enables a passenger such as a driver to ascertain visually that the door is locked when the door is closed, so that the usability characteristics of the car are improved.

As described above, the display device in this embodiment can display various messages toward the outside of the car by light emission. Therefore, various messages can be transmitted to persons outside the car.

In this embodiment, any light source unit other than the light source unit having the MEMS mirror 23 may be used, as long as it has a light source 21 that emits excitation light. Examples of such a light source unit include a light source unit that emits scanning light other than the light source unit having the MEMS mirror 23. Since the light source unit that emits scanning light is generally small in size, the light source unit enables displaying a message without occupying a large space inside the car, in similar to the light source unit having the MEMS mirror.

Further, the light source unit may also be a light source unit capable of irradiating the light emitting glass with the excitation light as beam light. The beam light is for displaying the whole message by light emission at the same timing, and prevents occurrence of scanning shift.

Examples of the light source unit other than the light source unit having the MEMS mirror include light source units utilizing the DMD (Digital Micromirror Device) method with DLP (Digital Light Processing), LCOS (Liquid crystal on silicon), or the like.

Further, when the message to display is changed, a projection system using any of the light source units may be utilized, but when a fixed icon or the like is displayed without changing the message, the aforementioned projection system does not have to be utilized, and the light source unit may be a light source unit that emits excitation light depending on the message.

Further, the use of the window glass for a vehicle of the present invention for cars has been described above, but the vehicles to which the window glass for a vehicle of the present invention is applied are not limited to cars, and may be other vehicles. Examples of the vehicles include, but not limited to, railway vehicles such as electric trains, steam-locomotive pulled trains, and trains, forklifts, heavy machineries for civil engineering such as excavators, carts, and amusement park vehicles.

[Light Emitting Glass]

Next, the light emitting glass used in the present invention will be described in detail. The light emitting glass used in the present invention may be composed of a single layer or may have a multilayer structure having two or more layers. Further, in the light emitting glass, it is preferable that at least one layer is a transparent plate. The transparent plate may be composed of any one of inorganic glass and organic glass. The organic glass is so-called resin glass. The light emitting glass having a multilayer structure may include one transparent plate or may include two or more transparent plates. Further, in the light emitting glass, such a transparent plate may contain a fluorescent material and serve as a light emitting layer that emits light through incident radiation of excitation light, or a layer other than the transparent plate may contain a fluorescent material and serve as a light emitting layer.

Further, the light emitting glass preferably has a multilayer structure comprising a laminate of at least one transparent plate and a resin film, and it is more preferable that the resin film contains a resin and a fluorescent material to serve as a light emitting layer in the multilayer structure.

Further, the light emitting layer is not limited to the resin film and the transparent plate mentioned above, and may be a fluorescent material coating formed by vacuum vapor deposition, sputtering, or the like of a fluorescent material. The fluorescent material coating may be formed, for example, on at least one surface of the transparent plate.

(Fluorescent Material)

The fluorescent material emits visible light through incident radiation of excitation light, more specifically, absorbs the excitation light irradiated from the aforementioned light source to emit visible light having a wavelength longer than that of the excitation light. Further, the fluorescent material may be a material that emits so-called phosphorescence by irradiation with the excitation light.

Specifically, examples of the aforementioned fluorescent material include a lanthanoid complex having a ligand containing a halogen atom since it can exert high luminescence. Among lanthanoid complexes, the lanthanoid complex having a ligand containing a halogen atom emits light with high emission intensity by irradiation with light rays. Examples of the lanthanoid complex having a ligand containing a halogen atom include a lanthanoid complex having a monodentate ligand containing a halogen atom and a lanthanoid complex having a multidentate ligand containing a halogen atom, such as a lanthanoid complex having a bidentate ligand containing a halogen atom, a lanthanoid complex having a tridentate ligand containing a halogen atom, a lanthanoid complex having a tetradentate ligand containing a halogen atom, a lanthanoid complex having a pentadentate ligand containing a halogen atom, and a lanthanoid complex having a hexadentate ligand containing a halogen atom.

Among these, the lanthanoid complex having a bidentate ligand containing a halogen atom or the lanthanoid complex having a tridentate ligand containing a halogen atom can emit visible light with high emission intensity by irradiation with light at a wavelength of 300 to 410 nm.

Further, the lanthanoid complex having a bidentate ligand containing a halogen atom or the lanthanoid complex having a tridentate ligand containing a halogen atom also has excellent heat resistance. Since window glass for a vehicle is often used under high-temperature condition due to irradiation with infrared rays of sunlight, use of the lanthanoid complex having a bidentate ligand containing a halogen atom or the lanthanoid complex having a tridentate ligand containing a halogen atom can prevent deterioration of the fluorescent material.

In this description, the lanthanoid includes lanthanum, cerium, praseodymium, neodymium, promethium, samarium, europium, gadolinium, terbium, dysprosium, holmium, erbium, thulium, ytterbium, or lutetium. For obtaining still higher emission intensity, the lanthanoid is preferably neodymium, europium, or terbium, more preferably europium or terbium, further preferably europium.

Examples of the bidentate ligand containing a halogen atom include a ligand having a structure represented by formula (1) below and a ligand having a structure represented by formula (2) below.

(1)

In formula (1) above, $R^1$ and $R^3$ each represent an organic group, at least one of $R^1$ and $R^3$ is an organic group containing a halogen atom, and $R^2$ represents a linear organic group having one or more carbon atoms. $R^1$ and $R^3$ above are each preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. The hydrogen atoms in the aforementioned hydrocarbon group may be partially replaced by atoms other than hydrogen atoms and functional groups. Examples of the hydrocarbon group having 1 to 3 carbon atoms include a methyl group, an ethyl group, and a propyl group, with no hydrogen atoms replaced, and a methyl group, an ethyl group, and a propyl group, with the hydrogen atoms partially replaced by halogen atoms. Fluorine atoms, chlorine atoms, bromine atoms, and iodine atoms can be used as the halogen atoms that partially replace the hydrogen atoms of the methyl group, the ethyl group, and the propyl group. As the hydrocarbon group having 1 to 3 carbon atoms, a methyl group, an ethyl group, and a propyl group, with the hydrogen atoms partially replaced by halogen atoms are preferable, and trifluoromethyl groups are more preferable, since they emit light with high emission intensity.

$R^2$ above is preferably an alkylene group having one or more carbon atoms, more preferably an alkylene group having 1 to 5 carbon atoms, most preferably a methylene group having one carbon atom. The alkylene group having one or more carbon atoms may have hydrogen atoms partially replaced by atoms other than the hydrogen atoms and functional groups.

The lanthanoid complex having a ligand containing a halogen atom may have at least one ligand containing a halogen atom and may have a ligand containing no halogen atoms. Examples of the ligand containing no halogen atoms include a ligand that is the same as the ligand of formula (1) above except for containing no halogen atoms, and a ligand having a structure represented by formula (2) to (8) below. The ligand having a structure represented by formula (2) to (8) below may have hydrogen atoms partially or entirely replaced by —COOR, —SO$_3$, —NO$_2$, —OH, an alkyl group, —NH$_2$, and the like.

(2)

In formula (2) above, two Ns may be located at any positions in the bipyridine skeleton. For example, the two Ns are located at the 2- and 2'-positions, the 3- and 3'-positions, the 4- and 4'-positions, the 2- and 3'-positions, the 2- and 4'-positions, or the 3- and 4'-positions in the bipyridine skeleton. Among these, the two Ns are preferably located at the 2- and 2'-positions.

(3)

In formula (3) above, the two Ns may be located at any positions in the bipyridine skeleton. Among these, the two Ns are preferably located at the 1- and 10-positions.

(4)

In formula (4) above, the two Ns may be located at any positions in the bipyridine skeleton. Among these, the two Ns are preferably located at the 1- and 10-positions.

(5)

In formula (5) above, the three Ns may be located at any positions in the terpyridine skeleton.

(6)

In formula (6) above, $R^4$ positioned at the center represents a linear organic group having one or more carbon atoms.

(7)

In formula (7) above, two $R^5$s each represent a linear organic group having one or more carbon atoms.

(8)

In formula (8) above, n represents an integer of 1 or 2.

Examples of the lanthanoid complex having a bidentate ligand containing a halogen atom include tris(trifluoroacetylacetone)phenanthroline europium (Eu(TFA)$_3$phen), tris(trifluoroacetylacetone)diphenylphenanthroline europium (Eu(TFA)$_3$dpphen), tris(hexafluoroacetylacetone)diphenylphenanthroline europium, tris(hexafluoroacetylacetone) bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)$_3$]bpy), tris(trifluoroacetylacetone)3,4,7,8-tetramethyl-1,10-phenanthroline europium ([Eu(TFA)$_3$]tmphen), tris(5,5,6,6,7,7,7-heptafluoro-2,4-pentanedionate)phenanthroline europium ([Eu(FPD)$_3$]phen), terpyridine trifluoroacetylacetone europium, and terpyridine hexafluoroacetylacetone europium.

Examples of the lanthanoid complex having a bidentate ligand containing a halogen atom additionally include tris(trifluoroacetylacetone)phenanthroline terbium (Tb(TFA)$_3$phen), tris(trifluoroacetylacetone)diphenylphenanthroline terbium (Tb(TFA)$_3$dpphen), tris(hexafluoroacetylacetone)diphenylphenanthroline terbium, tris(hexafluoroacetylacetone)bis(triphenylphosphine) terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10-phenanthroline terbium ([Tb(TFA)$_3$]tmphen), tris(5,5,6,6,7,7,7-heptafluoro-2,4-pentanedionate)

phenanthroline terbium ([Tb(FPD)₃]phen), terpyridine trifluoroacetylacetone terbium, and terpyridine hexafluoroacetylacetone terbium.

As the halogen atom contained in the ligand of the lanthanoid complex, a fluorine atom, a chlorine atom, a bromine atom, or an iodine atom can be used. Among these, a fluorine atom is suitable for stabilizing the structure of the ligand.

Among the lanthanoid complex having a bidentate ligand containing a halogen atom or the lanthanoid complex having a tridentate ligand containing a halogen atom, a lanthanoid complex having a bidentate ligand containing a halogen atom and having an acetylacetone skeleton is particularly suitable due to its excellent initial luminescence.

Examples of the lanthanoid complex having a bidentate ligand containing a halogen atom and having an acetylacetone skeleton include Eu(TFA)₃phen, Eu(TFA)₃dpphen, Eu(HFA)₃phen, [Eu(FPD)₃]bpy, [Eu(TFA)₃]tmphen, and [Eu(FPD)₃]phen. The structures of such a lanthanoid complex having a bidentate ligand containing a halogen atom and having an acetylacetone skeleton are shown below.

Eu(TFA)₃phen

[Eu(FPD)₃]bpy

Eu(TFA)₃dpphen

[Eu(TFA)₃]tmphen

Eu(HFA)₃phen

[Eu(FPD)₃]phen

Examples of the lanthanoid complex having a bidentate ligand containing a halogen atom and having an acetylacetone skeleton additionally include Tb(TFA)₃phen, Tb(TFA)₃ dpphen, Tb(HFA)₃phen, [Tb(FPD)₃]bpy, [Tb(TFA)₃]tmphen, and [Tb(FPD)₃]phen.

The lanthanoid complex having a ligand containing a halogen atom is preferably particulate. The particulate form makes it easier to finely disperse the lanthanoid complex having a ligand containing a halogen atom in the light emitting layer.

When the lanthanoid complex having a ligand containing a halogen atom is particulate, the lower limit of the average particle size of the lanthanoid complex is preferably 0.01 μm, and the upper limit thereof is preferably 10 μm. The lower limit is more preferably 0.03 μm, and the upper limit thereof is more preferably 1 μm.

As the aforementioned fluorescent material, a fluorescent material having a terephthalic acid ester structure can be also used. The fluorescent material having a terephthalic acid ester structure emits light by irradiation with light rays.

Examples of the fluorescent material having a terephthalic acid ester structure include a compound having a structure represented by formula (9) below and a compound having a structure represented by formula (10) below. One of these may be used singly, or two or more of these may be used.

(9)

(10)

In formula (9) above, R⁶ represents an organic group, and x is 1, 2, 3, or 4.

For further enhancing the visible light transmittance of the window glass for a vehicle, x is preferably 1 or 2, more preferably has a hydroxyl group at the 2- or 5-position of the benzene ring, and further preferably has hydroxyl groups at the 2- and 5-positions of the benzene ring.

The organic group of $R^6$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the hydrocarbon group has 10 or less carbon atoms, the fluorescent material having a terephthalic acid ester structure can be easily dispersed in the light emitting layer. The hydrocarbon group is preferably an alkyl group.

Examples of the compound having a structure represented by formula (9) above include diethyl-2,5-dihydroxyterephthalate and dimethyl-2,5-dihydroxyterephthalate. Among these, the compound having a structure represented by formula (9) above is preferably diethyl-2,5-dihydroxyl terephthalate ("diethyl 2,5-dihydroxyterephthalate" available from Aldrich).

In formula (10) above, $R^7$ represents an organic group, $R^8$ and $R^9$ each represent a hydrogen atom or an organic group, and y is 1, 2, 3, or 4.

The organic group of $R^7$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the number of carbon atoms in the hydrocarbon group is equal to or less than the upper limit, the fluorescent material having a terephthalic acid ester structure can be easily dispersed in the light emitting layer. The hydrocarbon group is preferably an alkyl group.

In formula (10) above, $NR^8R^9$ is an amino group. $R^8$ and $R^9$ are each preferably a hydrogen atom. Of the hydrogen atoms on the benzene ring of the compound having a structure represented by formula (10) above, one hydrogen atom may be replaced with the aforementioned amino group, two hydrogen atoms may be replaced with each the aforementioned amino group, three hydrogen atoms may be replaced with each the aforementioned amino group, and four hydrogen atoms may be replaced with each the aforementioned amino group.

The compound having a structure represented by formula (10) above is preferably diethyl-2,5-diaminoterephthalate (for example, available from Aldrich).

(Resin Film)

As described above, a resin film serving as the light emitting layer is preferably provided in the light emitting glass. Further, the light emitting glass preferably has a laminated glass structure in which an interlayer is provided between two transparent plates, and the two transparent plates are bonded together via the interlayer.

In the laminated glass structure, the interlayer is composed of a single layer of a resin film, and the resin film preferably serves as the light emitting layer. Further, two or more layers of resin films may be provided in the interlayer, and at least one of the plurality of resin films may serve as the light emitting layer.

Further, the resin film serving as the light emitting layer does not necessarily constitute the interlayer, and may be provided, for example, on the surface of any one of the transparent plates that is opposite to the surface on the interlayer side, in the laminated glass structure. Further, in the case when one transparent plate is provided in the light emitting glass, the resin film may be provided on any one of the surfaces of the single layer transparent plate.

In the case when the resin film serving as the light emitting layer is provided on the opposite surface in the laminated glass structure or any one surface of the single layer transparent plate, a sheet-shaped member having the light emitting layer (resin film) may be bonded to the surface of the single layer glass or the laminated glass structure via an adhesive, a pressure-sensitive adhesive, or the like. Thus, the light emitting layer can be provided on the window glass by so-called post bonding by attaching such a sheet-shaped member onto existing window glass.

The resin film serving as the light emitting layer contains a resin and a fluorescent material, in which the fluorescent material is generally dispersed in the resin. The fluorescent material may be dispersed throughout the light emitting layer. The resin used in the resin film is preferably a thermoplastic resin. Use of the thermoplastic resin makes it easy for the resin film to exert functions as an adhesive layer and facilitates bonding to the transparent plates or the like in the case of constituting an interlayer, as described above.

In the case when the resin film contains a fluorescent material, the content of the fluorescent material is preferably 0.001 parts by mass or more, more preferably 0.05 parts by mass or more, further preferably 0.1 parts by mass or more, based on 100 parts by mass of the resin. Adjusting the content of the fluorescent material to such a lower limit or more enables the light emitting glass to sufficiently emit light. Further, the content of the fluorescent material is preferably 10 parts by mass or less, more preferably 3 parts by mass or less, further preferably 1.5 parts by mass or less. Adjusting the content to such an upper limit or less facilitates ensuring the transparency of the light emitting glass.

The thickness of the resin film is not specifically limited, but is, for example, 0.1 to 2 mm, preferably 0.2 to 1 mm. Adjusting the thickness of the resin film to such a range enables sufficient light emission brightness to be ensured without impairing the transparency of the light emitting glass.

Further, the thickness of the interlayer is not specifically limited, but is, for example, 0.1 to 3 mm, preferably 0.2 to 2 mm.

As described above, the resin used in the resin film is preferably a thermoplastic resin. Further, the thermoplastic resin to be used in the resin film is not specifically limited, but examples thereof include a polyvinyl acetal resin, an ethylene-vinyl acetate copolymer resin, an ionomer resin, a polyurethane resin, and a thermoplastic elastomer. Use of such a resin facilitates ensuring the adhesiveness of the resin film to the transparent plates and is thus particularly suitable in the case when the resin film constitutes an interlayer.

In the resin film, one of such thermoplastic resins may be used singly or two or more of them may be used in combination. Among these, a polyvinyl acetal resin is particularly suitable in that excellent adhesiveness to inorganic glass is exerted in the case when a plasticizer is contained in the resin film.

In the case when the resin film comprises a thermoplastic resin, the resin film may further contain a plasticizer. The resin film is made flexible by containing a plasticizer therein, as a result of which, the light emitting glass is made flexible. Further, the adhesiveness to the transparent plates can be enhanced, particularly in the case when the transparent plates are inorganic glass. In the case of using a polyvinyl acetal resin as the thermoplastic resin, the plasticizer is particularly effective when contained in the layer.

Examples of the plasticizer include organic ester plasticizers such as monobasic organic acid esters and polybasic organic acid esters, and phosphoric acid plasticizers such as organic phosphoric acid plasticizers and organic phosphorous acid plasticizers. Among these, organic ester plasticizers are preferable, and triethylene glycol-di-2-ethyl hexanoate (3GO) is particularly suitable.

The content of the plasticizer is not specifically limited, but the lower limit is preferably 30 parts by mass, and the upper limit is preferably 70 parts by mass, relative to 100 parts by mass of the thermoplastic resin. In the case when the content of the plasticizer is 30 parts by mass or more, the light emitting glass is made appropriately flexible, so that the handleability is made good. Further, in the case when the content of the plasticizer is 70 parts by mass or less, separation of the plasticizer from the resin film is prevented. The lower limit of the content of the plasticizer is more preferably 35 parts by mass, and the upper limit is more preferably 63 parts by mass.

Further, in the case when the resin film of the present invention comprises a thermoplastic resin, the thermoplastic resin, or the thermoplastic resin and the plasticizer serve as main components, and the total amount of the thermoplastic resin and the plasticizer is generally 70 mass % or more, preferably 80 mass % or more, further preferably 90 mass % or more, based on the total amount of the resin film.

The resin film not serving as the light emitting layer is the same as described above, except that it does not contain a fluorescent material. Further, the resin film may contain additives such as antioxidants, adhesion modifiers, ultraviolet absorbers, infrared absorbers, and antistatic agents, as required.

(Transparent Plate)

As the transparent plate, those which can be used for light emitting glass can be used without specific limitation, and inorganic glass and organic glass can be used. The inorganic glass is not specifically limited, but examples thereof include clear glass, float plate glass, polished plate glass, figured glass, net-wired plate glass, line-wired plate glass, and green glass.

Further, as the organic glass, those generally called resin glass are used without specific limitation, but examples thereof include transparent organic glass composed of resins such as polycarbonates, acrylic resins, acrylic copolymer resins, and polyesters.

In the case when the light emitting glass has two or more transparent plates, the plurality of transparent plates may be composed of the same material as each other and may be composed of different materials. For example, in the case when two transparent plates are included, one may be inorganic glass and the other may be organic glass. However, in the case when a plurality of transparent plates are included, the plurality of transparent plates are preferably all inorganic glass or all organic glass.

Further, the thickness of each transparent plate is not specifically limited, but is, for example, about 0.1 to 15 mm, preferably 0.5 to 5 mm. In the case when the light emitting glass has a plurality of transparent plates, the thickness of each transparent plate may be the same or different.

As described above, in the light emitting glass, the transparent plate may serve as the light emitting layer that emits visible light. In the case when the transparent plate serves as the light emitting layer, the transparent plate itself contains the fluorescent material. In such a case, the fluorescent material may be dispersed in the inorganic material constituting inorganic glass or the organic material (resin) constituting organic glass of the transparent plate. Here, the fluorescent material may be preferably dispersed throughout the transparent plate. In the case when the transparent plate itself contains the fluorescent material, the content of the fluorescent material is preferably 0.001 parts by mass or more, more preferably 0.05 parts by mass or more, further preferably 0.1 parts by mass or more, relative to 100 parts by mass of the inorganic material constituting inorganic glass or 100 parts by mass of the resin constituting organic glass. Adjusting the content of the fluorescent material to such a lower limit or more enables the light emitting glass to sufficiently emit light. Further, the content of the fluorescent material is preferably 10 parts by mass or less, more preferably 3 parts by mass or less, further preferably 1.5 parts by mass or less. Adjusting the content of the inorganic material to such an upper limit or less prevents the transparency of the light emitting glass from being impaired by the fluorescent material.

In the case when the transparent plate contains the fluorescent material to serve as the light emitting layer, the light emitting glass may have the laminated glass structure as described above or the transparent plate may be composed of a single layer. In the case of having the laminated glass structure, at least one transparent plate may serve as the light emitting layer.

The light emitting glass may transmit visible light or may be configured not to transmit visible light, but preferably transmits visible light. To transmit visible light means, for example, that the visible light transmittance is 30% or more, preferably 50% or more.

In the case when the light emitting glass is used, for example, as windshield, front side glass or the like for a car, the visible light transmittance is preferably 70% or more, more preferably 75% or more, further preferably 80% or more, for enhancing the transparency of the light emitting glass and ensuring the car safety. Further, the upper limit of the visible light transmittance is not specifically limited and is preferably as high as possible, but is practically preferably 99% or less, more preferably 95% or less. The visible light transmittance means an average of visible light transmittance at 400 to 780 nm and can be measured, for example, using an ultraviolet-visible-infrared spectrophotometer (UH4150, manufactured by Hitachi High-Technologies Corporation) according to JIS R3212.

Further, the light emitting glass emits visible light due to the excitation light incident from the light source, as described above. The visible light is generally light having a wavelength of 400 to 780 nm. Further, the light emitting glass may emit blue, green, red, and other light or may emit white light by mixing light of two or more colors. In the case of mixing light of two or more colors, for example, two or more light emitting layers may be provided, so that each layer emits light of different color for mixing colors, or one light emitting layer may contain two or more fluorescent materials.

REFERENCE SIGNS LIST

10: Car (vehicle)
11: Windshield
11A, 11B: Transparent plate
11B: Interlayer
12: Side glass
12A: Front side glass
12B: Rear side glass
13: Rear glass
14: Dashboard
16: Side door
16A: Front side door
16B: Rear side door
17: Message
20: Light source unit
21: Light source
23: MEMS mirror

The invention claimed is:

1. A display device comprising:
a light source irradiating excitation light; and
a window glass for a vehicle, the window glass emitting visible light through incident radiation of the excitation light,
the window glass being allowed to emit the visible light so as to display a message toward an outside of the vehicle by irradiation with the excitation light,
wherein the window glass comprises two transparent plates and an interlayer provided between the two transparent plates so as to be in direct contact with the two transparent plates, and has a laminated glass structure in which the two transparent plates are bonded together via the interlayer,
wherein the interlayer is a resin film comprising a resin and a fluorescent material dispersed in the resin, the fluorescent material being capable of emitting visible light through incident radiation of the excitation light, and
wherein the light source is arranged in an interior of the vehicle, the interior of the vehicle being inward of an innermost surface of the window glass, and the innermost surface of the window glass is irradiated with the excitation light.

2. The display device according to claim 1, wherein the message comprises at least one selected from the group consisting of a sentence, a trademark, a warning, and a message showing a vehicle condition.

3. The display device according to claim 1, wherein the message is for surrounding cars or for pedestrians and light vehicles.

4. The display device according to claim 1, wherein the display device is configured to display the message toward the outside of the vehicle based on an inputted voice.

5. The display device according to claim 1, wherein the display device is configured to display the message toward the outside of the vehicle when it is inferred that a movable body is approaching.

6. The display device according to claim 1, wherein the display device is configured to change a position of displaying the message toward the outside of the vehicle depending on a direction from which a movable body is approaching.

7. The display device according to claim 1, wherein the light source is configured to irradiate the excitation light in a desired pattern such that the visible light emitted by the window glass forms the message, the message being a desired message among a plurality of messages, the desired message corresponding to the desired pattern of the irradiated excitation light.

8. A message transmission method comprising:
irradiating excitation light from a light source toward a window glass for a vehicle, the window glass emitting visible light through incident radiation of the excitation light; and
allowing the window glass to emit the visible light so as to display a message toward an outside of the vehicle by irradiation with the excitation light, thereby transmitting the message toward the outside of the vehicle,
wherein the window glass comprises two transparent plates and an interlayer provided between the two transparent plates so as to be in direct contact with the two transparent plates, and has a laminated glass structure in which the two transparent plates are bonded together via the interlayer,
wherein the interlayer is a resin film comprising a resin and a fluorescent material dispersed in the resin, the fluorescent material being capable of emitting visible light through incident radiation of the excitation light, and
wherein the light source is arranged in an interior of the vehicle, the interior of the vehicle being inward of an innermost surface of the window glass, and the irradiating of the excitation light comprises irradiating the innermost surface of the window glass with the excitation light.

9. The message transmission method according to claim 8, wherein the message comprises at least one selected from the group consisting of a sentence, a trademark, a warning, and a message showing a vehicle condition.

10. The message transmission method according to claim 8, wherein the message is for surrounding cars or for pedestrians and light vehicles.

11. The message transmission method according to claim 8, further comprising displaying the message toward the outside of the vehicle based on an inputted voice.

12. The message transmission method according to claim 8, further comprising displaying the message toward the outside of the vehicle when it is inferred that a movable body is approaching.

13. The message transmission method according to claim 8, further comprising changing a position of displaying the message toward the outside of the vehicle depending on a direction from which a movable body is approaching.

14. The message transmission method according to claim 8, wherein the excitation light is irradiated in a desired pattern such that the visible light emitted by the window glass forms the message, the message being a desired message among a plurality of messages, the desired message corresponding to the desired pattern of the irradiated excitation light.

* * * * *